(12) United States Patent
Lee et al.

(10) Patent No.: US 8,917,500 B2
(45) Date of Patent: Dec. 23, 2014

(54) PORTABLE COMPUTER

(75) Inventors: Shang-Mao Lee, New Taipei (TW);
Chun-Chien Chen, New Taipei (TW);
Hung-Chih Chen, New Taipei (TW);
Cheng-Hsiang Chuang, New Taipei (TW)

(73) Assignee: Wistron Corporation, New Taipei (TW)

( * ) Notice: Subject to any disclaimer, the term of this patent is extended or adjusted under 35 U.S.C. 154(b) by 124 days.

(21) Appl. No.: 13/616,626

(22) Filed: Sep. 14, 2012

(65) Prior Publication Data

US 2013/0128441 A1   May 23, 2013

Related U.S. Application Data

(60) Provisional application No. 61/561,312, filed on Nov. 18, 2011.

(30) Foreign Application Priority Data

Apr. 3, 2012  (TW) .............................. 101111905 A

(51) Int. Cl.
*H05K 7/00* (2006.01)
*G06F 1/16* (2006.01)
*H05K 5/00* (2006.01)
*F16M 11/00* (2006.01)

(52) U.S. Cl.
CPC ............ *G06F 1/1616* (2013.01); *G06F 1/1681* (2013.01); *Y10S 248/919* (2013.01); *Y10S 345/905* (2013.01)
USPC .............. 361/679.27; 248/176.1; 248/225.21; 248/919; 345/905; 349/58

(58) Field of Classification Search
CPC .................. G06F 1/16–1/1654; G06F 1/1656; G06F 1/1662–1/1681; G06F 1/1684–1/189; G06F 1/20; G06F 1/203; G06F 1/206; G06F 2200/201; G06F 2200/202; G06F 2200/203; H05K 5/00; H05K 5/0026; H05K 5/0082; H05K 5/0021; H05K 5/0086–5/06; H05K 5/069; H05K 7/005–7/08; H05K 7/20; H05K 7/00; H05K 7/1422; H05K 1/0218–1/0219; H05K 1/00; H05K 3/00; H05K 9/00; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H01R 4/00; H01R 9/00; H01R 13/00; H01K 1/00; H01K 3/00; H02B 1/00; H01H 37/00
USPC ................ 361/679.01–679.61; 248/919–923, 248/176.1, 225.21; 345/905; 349/58
See application file for complete search history.

(56) References Cited

U.S. PATENT DOCUMENTS

| | | | | |
|---|---|---|---|---|
| 5,008,976 | A * | 4/1991 | Busch | ............................. 16/276 |
| 6,480,373 | B1 * | 11/2002 | Landry et al. | ............ 361/679.06 |
| 6,980,423 | B2 * | 12/2005 | Tanaka et al. | ............ 361/679.06 |
| 7,126,816 | B2 * | 10/2006 | Krah | ........................ 361/679.55 |
| 7,184,263 | B1 * | 2/2007 | Maskatia | ................. 361/679.27 |
| 7,639,494 | B2 * | 12/2009 | Lin | ............................ 361/679.55 |
| 7,652,873 | B2 * | 1/2010 | Lee | ............................ 361/679.06 |
| 7,876,554 | B2 * | 1/2011 | Chou et al. | ............... 361/679.28 |
| 7,907,393 | B2 * | 3/2011 | Sellers | ..................... 361/679.27 |
| 7,916,462 | B2 * | 3/2011 | Hung | ....................... 361/679.27 |
| 8,081,437 | B2 * | 12/2011 | Leng | ........................ 361/679.23 |
| 8,605,417 | B2 * | 12/2013 | Lin et al. | .................. 361/679.05 |
| 8,644,012 | B2 * | 2/2014 | Lee | ............................ 361/679.26 |
| 2003/0103324 | A1 * | 6/2003 | Gallivan | ...................... 361/681 |
| 2005/0139740 | A1 * | 6/2005 | Chen et al. | ................. 248/286.1 |
| 2006/0077622 | A1 | 4/2006 | Keely et al. | |
| 2007/0030634 | A1 | 2/2007 | Maskatia | |
| 2008/0198542 | A1 * | 8/2008 | Kim | .............................. 361/683 |
| 2009/0021898 | A1 * | 1/2009 | Konno et al. | ............ 361/679.55 |
| 2010/0309612 | A1 | 12/2010 | Liang et al. | |

FOREIGN PATENT DOCUMENTS

| | | |
|---|---|---|
| CN | 2174715 Y | 8/1994 |
| CN | 1784133 A | 6/2006 |
| TW | 426174 U | 3/2001 |
| TW | 556583 U | 12/2003 |
| TW | 584227 U | 4/2004 |

| | | |
|---|---|---|
| TW | M243748 U | 9/2004 |
| TW | 200707220 | 2/2007 |
| TW | M323952 U | 12/2007 |
| TW | 200815963 A | 4/2008 |
| TW | 200827832 A | 7/2008 |
| TW | M367554 U | 10/2009 |
| TW | M398651 U | 2/2011 |
| TW | 201128355 A | 8/2011 |

OTHER PUBLICATIONS

Taiwan Patent Office, Office Action of corresponding Taiwan Application No. 101106214 (including 6 pages English translation of marked portion of pp. 1-8 of Office Action), issued Jun. 17, 2014, 16 pages.

Taiwan Patent Office, Office Action of corresponding Taiwan Application No. 101111905 (including 6 pages English translation of marked portion of pp. 1-9 of Office Action), issued Sep. 3, 2014, 17 pages.

* cited by examiner

*Primary Examiner* — Zachary M Pape
*Assistant Examiner* — Razmeen Gafur
(74) *Attorney, Agent, or Firm* — Alan D. Kamrath; Kamrath IP Lawfirm, P.A.

(57) ABSTRACT

A portable computer comprises a base, a display module, at least one support element and at least one sliding assembly. The base comprises a first area and a second area. The display module comprises a connect end and a display face. Each support element comprises a first end pivoted on a portion of the display module other than the display face and a second end pivoted on the rear end of the base. Each sliding assembly comprises a slide rail disposed at least in the second area and a roller sliding element connected with the connect end and moved along the slide rail.

22 Claims, 15 Drawing Sheets

PORTABLE COMPUTER

BACKGROUND OF THE INVENTION

1. Field of the Invention

The present relates to a portable computer, and more particularly, to a portable computer which can move a display towards a user and keep the display at a tilted angle.

2. Description of the Related Art

Computing devices have become an indispensable part of our daily life. With the fast development of touch technologies, most hand-held devices or electronic devices such as tablet PC, smart phone, and PDA now provide touch panels instead of mouse or keyboard as input devices, these devices are equipped with operating system supporting touch functions to enable intuitive and convenient operations.

As notebook PCs are usually equipped with QWERTY keyboards and touch pads for input functions and they also use operating system which does not support touch functions or interfaces which cannot recognize touch gestures, so few notebook PCs provide touch functions or designs in the past. However, as software vendors are rolling out new operating system which can support touch functions and people are becoming familiar with touch gestures required to operate tablet PCs or smart phones, it is now necessary for manufactures to provide touch functions on notebook PCs or even transform their notebook PCs into tablet PCs. Due to a certain weight of the display, when a user opens the display to a suitable angle relative to the base for touch operations, the display is kept in a fixed position by a reactive torsion of a pivot bearing between the display and the base; however, when the user touches the display, a torque generated by the applied force and the distance between the point of applied force and the pivot bearing would cause the display to vibrate back and forth, making it inconvenient for the user to perform any touch function and hard to see the display clearly. Furthermore, when the user applies too much force on the display, the display could topple and fall backwards without proper support, the display could be damaged to discourage the user to perform any touch function.

Therefore, a prior art technique discloses a support arm for supporting and pivotally connecting to the display.

In prior art technique such as Taiwan patent No. I316666 (U.S. Pat. No. 7,184,263B1), a portable computer uses a sheet-like support element to support a display and to let the display slide relative to the computer body via guide grooves on both sides of the keyboard to stand upright. However, this design can only apply for tablet PCs which have their displays faced upwards in a normal state and is not suitable for notebook PCs which usually have their displays faced down and towards a keyboard when not in use. Therefore, the patent is designed specifically for tablet PCs having their display exposed outwardly and allows the user to slide the display to a tilted angle for operations. However, the display is not well protected since it is exposed in any circumstances.

In another prior art technique such as Taiwan patent No. 566583, a notebook PC having its display rotatably moved relative to a base via a plurality of connecting rods to change a viewing angle for the user. However, this patent comprises complicated design which involves the operations of pivoting, linking and sliding and various linkage elements to work. Therefore, it is disadvantageous to assemble and to operate the mechanism. Besides, with a complicated mechanism and exposed support and linkage mechanisms on both sides of the display, it is aesthetically unpleasant and is possible to hurt the user if the user's finger accidentally gets pinched between these mechanisms. Additionally, the prior art technique requires reserved spaces for disposing grooves and pivoting mechanisms on both sides of the base, and it also require additional spaces for disposing support elements on both sides of the display case as well, so the whole thing tends to be bulky and thick, and it could sacrifice the viewable area of the display.

Therefore, it is necessary to provide a structure which can stably support the display and slide the display to a suitable angle for the portable computer.

SUMMARY OF THE INVENTION

It is an object of the present invention to provide a portable computer which can stably move a display towards a user and keep the display at a tilted angle.

In order to achieve the above object, the present invention discloses a portable computer which comprises a base, a display module, at least one support element and at least one sliding assembly. The base comprises, between a front end and a rear end, a first area disposed at a front side of the base and a second area disposed at a rear side of the base. The display module comprises a connecting end, a display face and a support plane opposite to the display face. Each support element comprises a first fixed end and a second fixed end, wherein the first fixed end is pivotally connected to a portion of the display module other than the display face, so that the display module is able to rotate relative to the support element; and the second fixed end is pivotally connected to the rear end or a proximity of the rear end of the base, so that the support element is able to rotate relative to the base. Each sliding assembly comprises a roller sliding element and a slide rail, wherein the slide rail is at least disposed in the second area of the base, the roller sliding element is connected with the connecting end of the display module, and the roller sliding element can roll and slide along the slide rail.

Accordingly, when the display module is opened and rotated to a suitable angle relative to the base via the second fixed end of the at least one support element, the display module can further rotate around the first fixed end of the at least one support element with the first fixed end serving as a pivot point, and drives the connecting end of the display module to move from the second area towards the first area to a suitable position along with the roller sliding element, and then the display module is supported by the at least one support element to keep a suitable tilted angle.

Through the design of the present invention, a user can turn the display module relative to the base, so as to stably slide the connecting end of the display module driven by a roller structure towards the user to a suitable tilted angle via interactions between various pivoting elements and connecting rods. The display module is also supported by the at least one support element to provide better viewing or operating effect for the user.

Other objects, advantages, and novel features of the invention will become more apparent from the following detailed description when taken in conjunction with the accompanying drawings.

BRIEF DESCRIPTION OF THE DRAWINGS

In the drawings, wherein similar reference numerals denote similar elements throughout the several views.

DETAILED DESCRIPTION OF THE PREFERRED EMBODIMENT

The advantages and innovative features of the invention will become more apparent from the following detailed description when taken in conjunction with the accompanying drawings.

Figure 1:
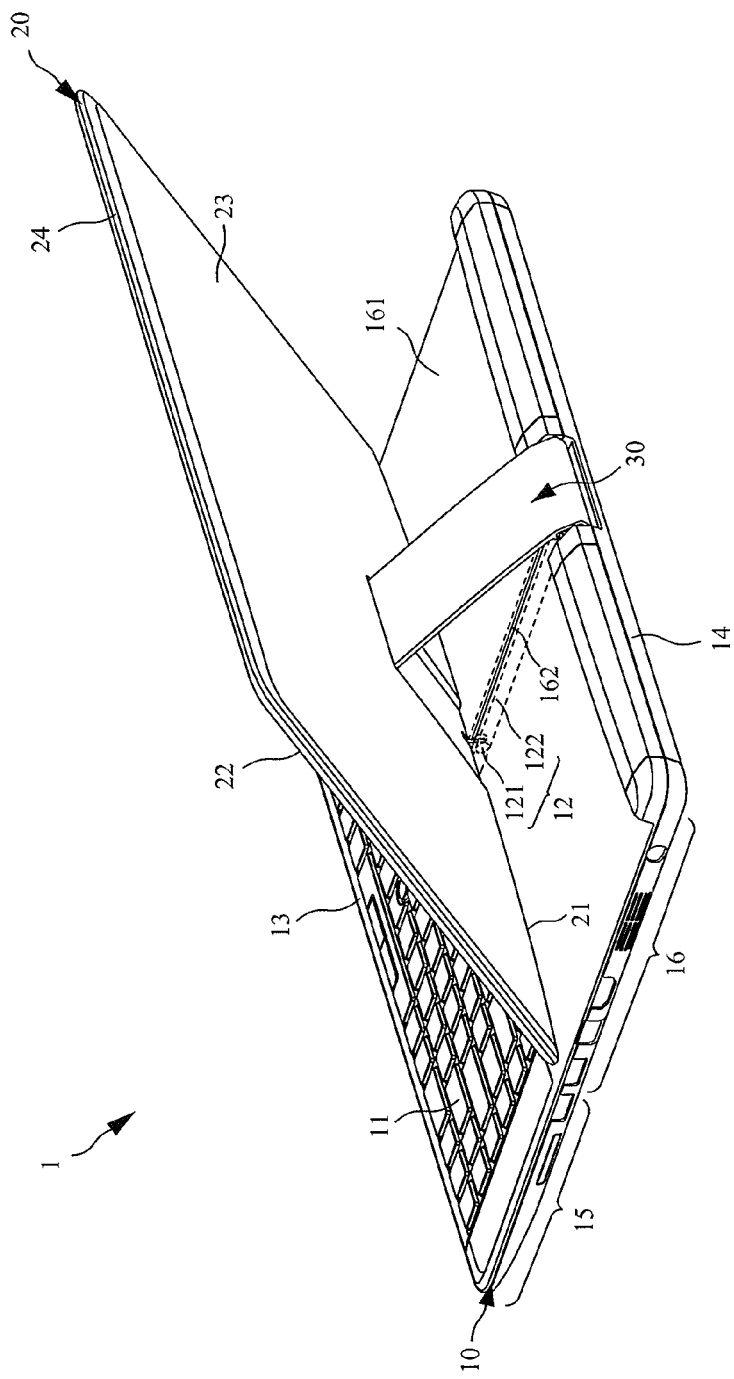
FIG. 1 illustrates a schematic view of a portable computer of the present invention.
Figure 2:
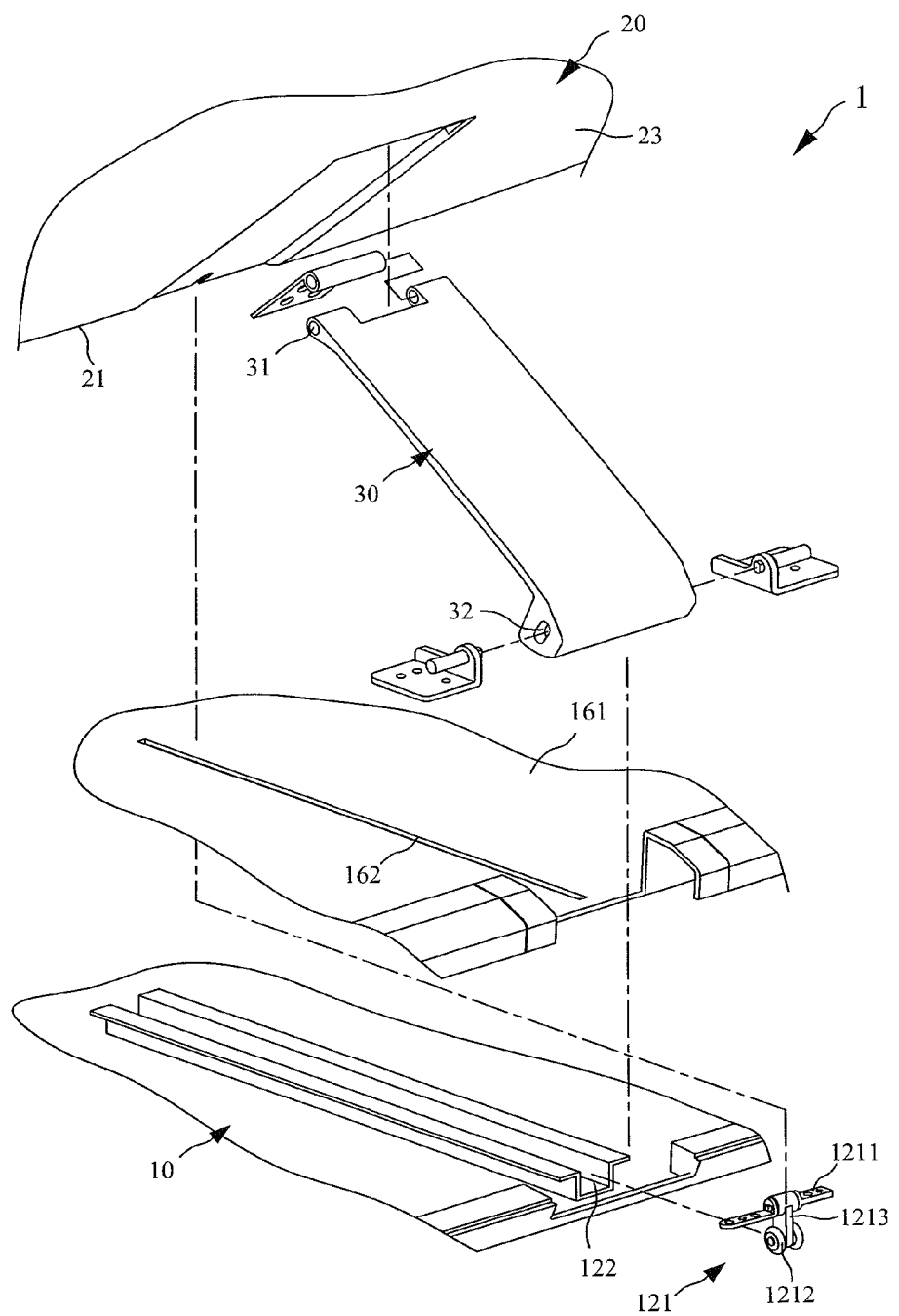
FIG. 2 illustrates a partial explosive view of a first embodiment of the portable computer of the present invention.

Please refer to FIG. 1 and FIG. 2. FIG. 1 illustrates a schematic view of a portable computer 1 of the present invention; FIG. 2 illustrates a partial explosive view of a first embodiment of the portable computer 1 of the present invention. In one embodiment of the present invention, the portable computer 1 is a notebook PC, but according to various application types, the portable computer 1 can also be a tablet PC, a mini laptop, or other electronic devices comprising flip-top type display modules without limiting the scope of the present invention.

As shown in FIG. 1 and FIG. 2, the portable computer 1 of the present invention comprises a base 10, a display module 20 and a support element 30. The base 10 is installed with a computer host and related electronic components. The top of the base 10 is segmented into a first area 15 and a second area 16 between a front end 13 and a rear end 14 of the base 10, wherein the first area 15 is disposed near the front end 13 and the second area 16 is disposed near the rear end 14. The first area 15 is provided for being installed with a keyboard 11 and/or other input devices such as a touch pad or a track point, and the second area 16 comprises a sliding assembly 12. In other embodiments, the sliding assembly 12 can extend forward to a part or all of the first area 15. It is noted that the sliding assembly 12 can be disposed in a central portion of the second area 16 or a substantially central portion of the second area 16.

The sliding assembly 12 comprises a roller sliding element 121 and a slide rail 122. The roller sliding element 121 is an element combined with both a roller sliding function and a pivoting function. The roller sliding element 121 can slide along the slide rail 122 so as to move with respect to the base 10 in the second area 16 between the rear end 14 of the base 10 and the keyboard 11. A slit 162 is disposed in the middle of the surface 161 of the second area 16, and the sliding assembly 12 is disposed at a position at the bottom of the second area 16 corresponding to the slit 162. In other embodiments, the sliding assembly 12 can also extend from the second area 16 to the first area 15, so that the slit 162 can be located on the surface of the second area 16 and a part or all of the first area 15, and the slide rail 122 can be correspondingly disposed below the surface of the second area 16 and the first area 15.

The display module 20 comprises a connecting end 21, a display face 22, a support plane 23 and a free end 24. The display face 22 is disposed opposite to the support plane 23. The connecting end 21 is opposite to the free end 24. The display module 20 is pivotally connected to the roller sliding element 121 at a central portion 21a of the connecting end 21 via such as a hinge element to form a rotatable pivot point, so that the display module 20 is able to rotate relative to the roller sliding element 121. The display module 20 can have a display screen supporting a touch function disposed in the display face 22 for receiving touch control operations from the user.

The support element 30 comprises a first fixed end 31 and a second fixed end 32. The first fixed end 31 is pivotally connected to the support plane 23 of the display module 20 via such as a hinge element to form a rotatable pivot point, so that the display module 20 is able to rotate relative to the support element 30. The second fixed element 32 can also be pivotally connected to the rear end 14 of the base 10 via such as a hinge element to form another rotatable pivot point, so that the support element 30 is able to rotate relative to the base 10.

As shown in FIG. 2, in one embodiment of the present invention, the roller sliding element 121 of the sliding assembly 12 comprises a pivoting portion 1211, a roller portion 1212 and a connecting portion 1213. The connecting end 21 of the display module 20 is rotatably pivoted to the roller sliding element 121 via the pivoting portion 1211. For example, the pivoting portion 1211 can be a hinge element without torsion and can be rotated simply by a pin. Or, the pivoting portion 1211 can be a hinge element conventionally disposed between the display screen and the base of a laptop computer and capable of generating torsion or suitable rotation friction. The roller portion 1212 is connected to the pivoting portion 1211 via the connecting portion 1213; and the slide rail 122 of the sliding assembly 12 is used for disposing the roller portion 1212 of the roller sliding element 121. The roller portion 1212 comprises at least one roller, wherein each roller makes contact with an inner wall of the slide rail 122 for rolling and sliding. In this embodiment, the design of the roller portion 1212 varies according to the size and available space of the slide rail 122; however, the roller portion 1212 can have various shapes or forms as long as it serves the purpose of the present invention.

In order to comply with the uniformity and the sense of design of the portable computer 1, the slide rail 122 of the sliding assembly 12 is disposed below the surface 161 of the second area 16 of the base 10, and corresponds to the position of the slit 162 to be hidden disposition. The structure of the roller sliding element 121 of the sliding assembly 12 corresponds to the slit 162 of the surface 161 of the base 10. The slit 162 have a width smaller than the width of the roller portion 1212 and not smaller than the thickness of the connecting portion 1213. However, there is an exception that the width of the slit 162 can be smaller than the thickness of the connecting portion 1213 if an elastic material, such as flannel, is applied in the structure of the slit 162. Therefore, the connecting portion 1213 of the roller sliding element 121 can go through and move along the slit 162, and the pivoting portion 1211 can protrude out of the surface 161 of the base 10, so that the connecting end 21 of the display module 20 and the pivoting portion 1211 can be pivotally connected to each other.

Figure 3:
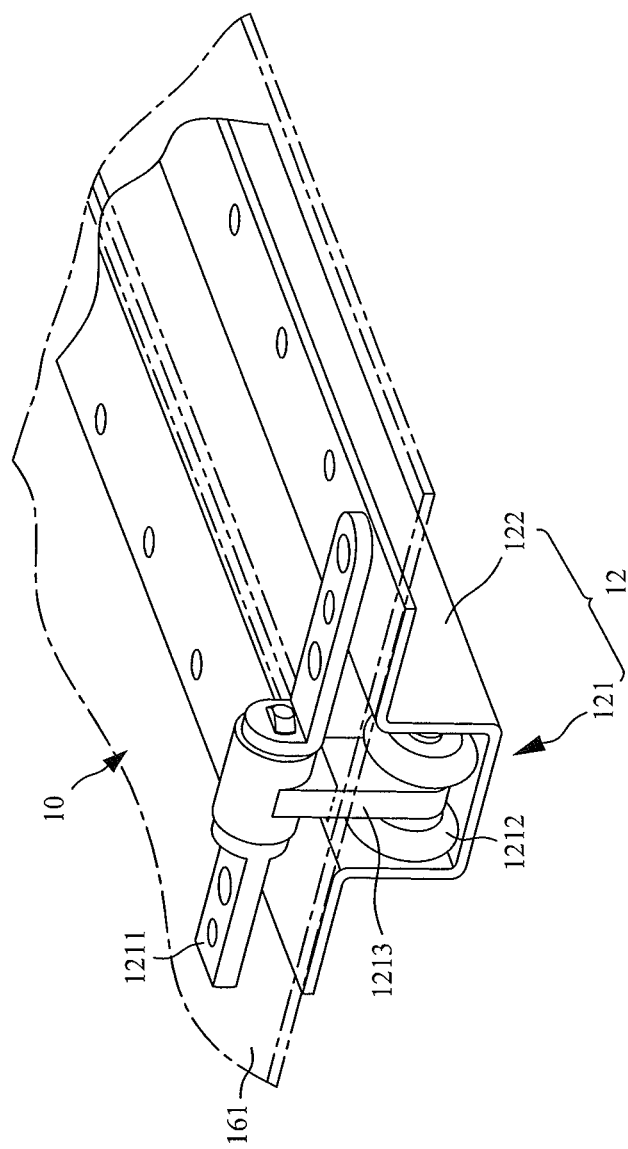
FIG. 3 illustrates a schematic view of the first embodiment of a sliding assembly of the portable computer of the present invention.

Please refer to FIG. 3, which illustrates a schematic view of the first embodiment of the sliding assembly 12 of the portable computer 1 of the present invention. As shown in FIG. 3, in this embodiment, the roller portion 1212 of the roller sliding element 121 adopts a coaxial dual roller structure design for sliding within the slide rail 122 disposed below the surface 161 of the base 10. Aside from the exposed pivoting portion 1211 of the roller sliding element 121 and a part of the connecting portion 1213, the other portion of the roller sliding element 121 (including the roller portion 1212 and the other portion of the connecting portion 1213) and the slide rail 122 can be hidden below the surface 161 of the base 10. While the exposed pivoting portion 1211 and the surface 161 of the base 10 are spaced apart by the partially exposed connecting portion 1213 to keep a spacing, so that the display module 20 (not shown in FIG. 3, please refer to FIG. 2) pivotally connected to the pivoting portion 1211 can rotate smoothly without running into the base 10. Therefore, the present invention can provide a design which is both aesthetically appearing and practical in enabling the operation between the roller sliding element 121 and the display module 20.

Figure 4A:
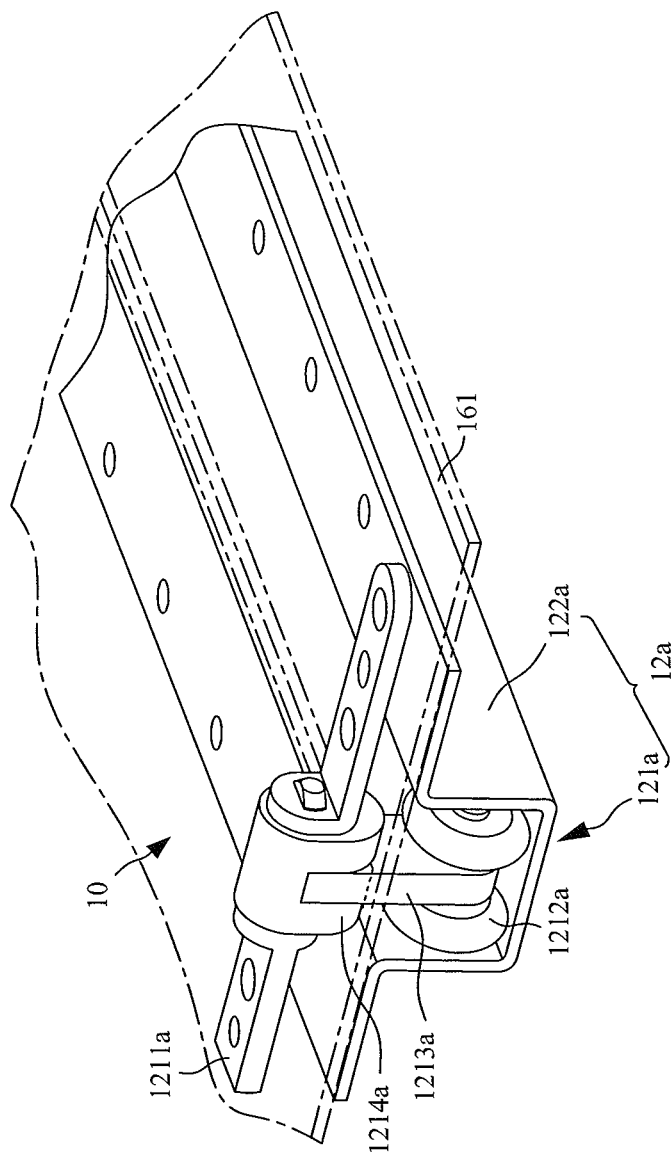
FIG. 4(a) illustrates a schematic view of a second embodiment of the sliding assembly of the portable computer of the present invention.
Figure 4B:
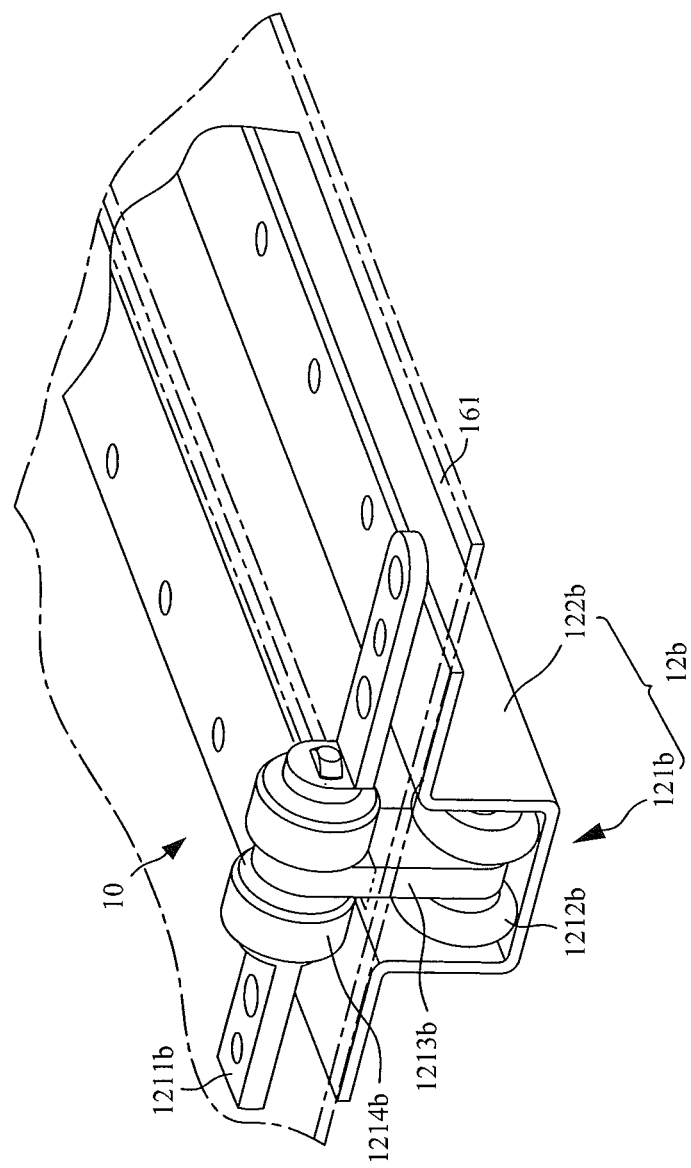
FIG. 4(b) illustrates a schematic view of a third embodiment of the sliding assembly of the portable computer of the present invention.

Please refer to both FIG. 4(a) and FIG. 4(b). FIG. 4(a) illustrates a schematic view of a second embodiment of the sliding assembly 12a of the portable computer 1 of the present invention; FIG. 4(b) illustrates a schematic view of a third embodiment of the sliding assembly 12b of the portable computer 1 of the present invention. The second embodiment is a variation of the abovementioned first embodiment. As shown in FIG. 4(a), in this embodiment, the roller sliding element 121a further comprises at least one retaining portion 1214a, each retaining portion 1214a is disposed between the pivoting portion 1211a and the connecting portion 1213a. Since a spacing between the exposed pivoting portion 1211a and the surface 161 of the base 10 is maintained by the partially exposed connecting portion 1213a, when the connecting end of the display module (not shown in FIG. 4(a), please refer to FIG. 2) drives the roller sliding element 121a to slide, the roller sliding element 121a could rotate around the roller portion 1212a with its roller coupling portion serving as the pivot point, so that the roller sliding element 121a could tilt forwardly or backwardly to further interfere the sliding operation of the roller sliding element 121a. Therefore, the at least one retaining portion 1214a is disposed for making contact with the surface 161 of the base 10 in advance, so that the roller sliding element 121a is able to continuously make contact with the surface 161 of the base 10, thereby keeping the limited spacing between the pivoting portion 1211a and the surface 161 and thus enhancing stability of the sliding operation. In this embodiment, the retaining portion 1214a is, but not limited to, an elliptical cam structure respectively disposed between the pivoting portion 1211a and the connecting portion 1213a.

The third embodiment is a variation of the abovementioned second embodiment. As shown in FIG. 4(b), the retaining portion 1214b of the roller sliding element 121b of the sliding assembly 12b can be replaced by another roller structure, such that when the roller sliding element 121b slides, the roller structure of the retaining portion 1214b not only can provide the abovementioned effect of keeping the spacing, but also can make contact with the surface 161 of the base 10 for sliding (i.e., the upper roller structure rolls on the surface 161, and the lower roller structure rolls on a bottom surface of the slide rail 122b), such that the sliding operation of the roller sliding element 121b can be smoother; and the friction generated between the retaining portion 1214b and the surface 161 of the base 10 can be reduced. Further, in this embodiment, the diameters and pulley widths of the upper roller structure and the lower roller structure are not necessarily to be the same, their relative ratios and sizes can be adjusted according to practical requirements and experimental results.

Figure 5A:
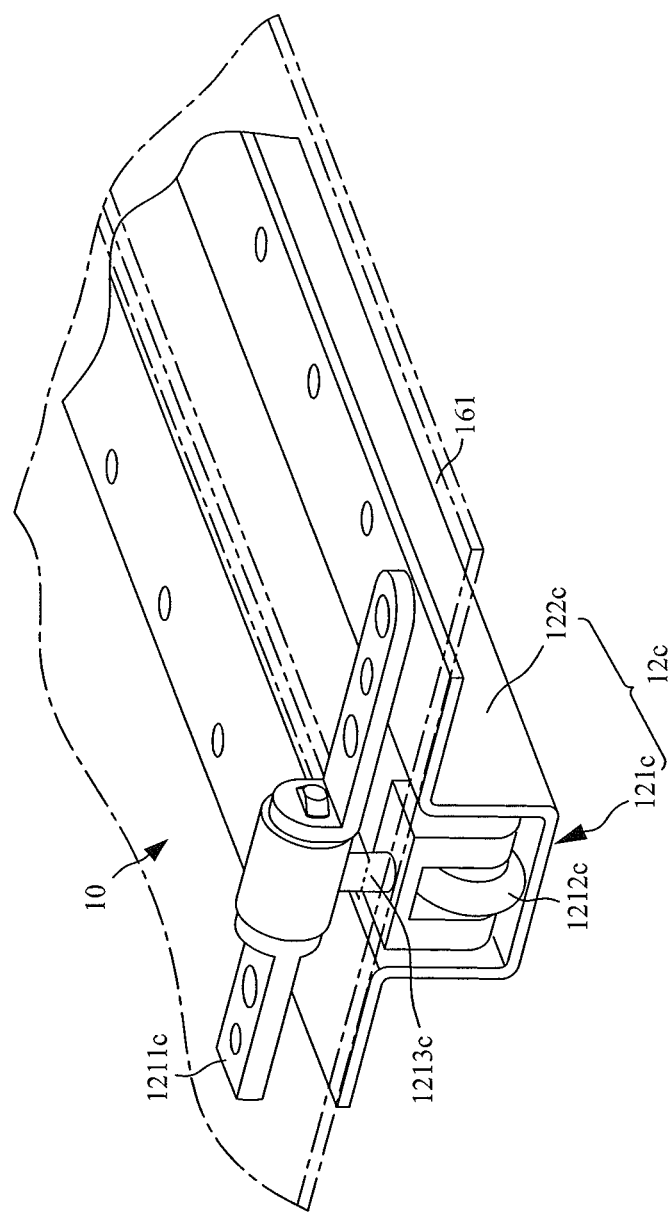
FIG. 5(a) illustrates a schematic view of a fourth embodiment of the sliding assembly of the portable computer of the present invention.
Figure 5B:
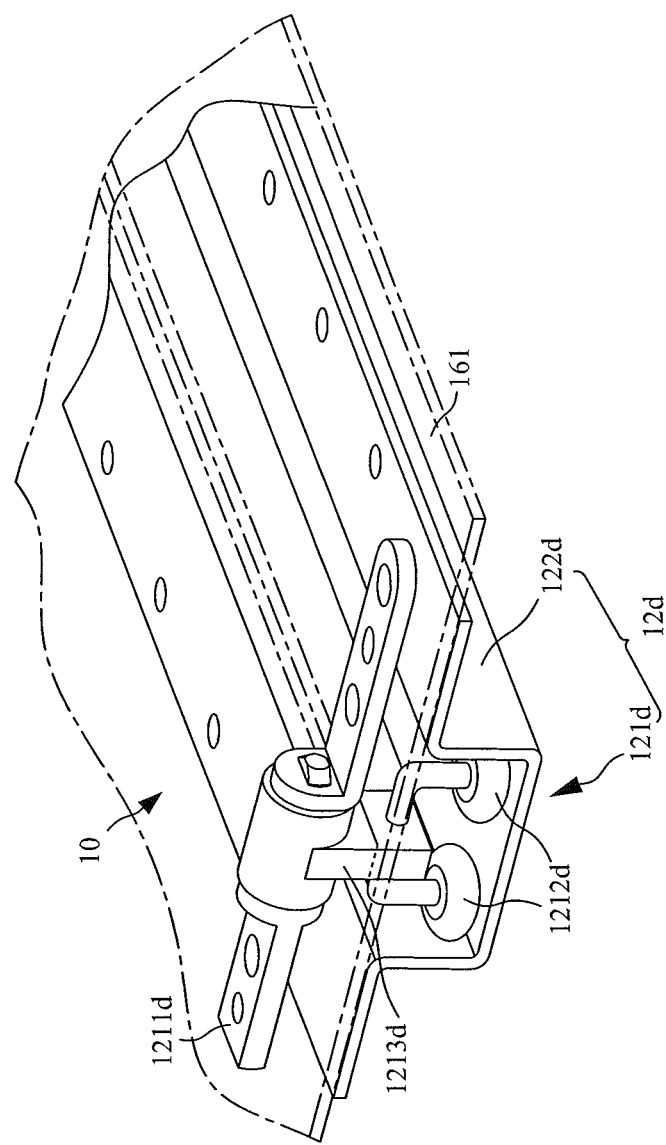
FIG. 5(b) illustrates a schematic view of a fifth embodiment of the sliding assembly of the portable computer of the present invention.
Figure 5C:
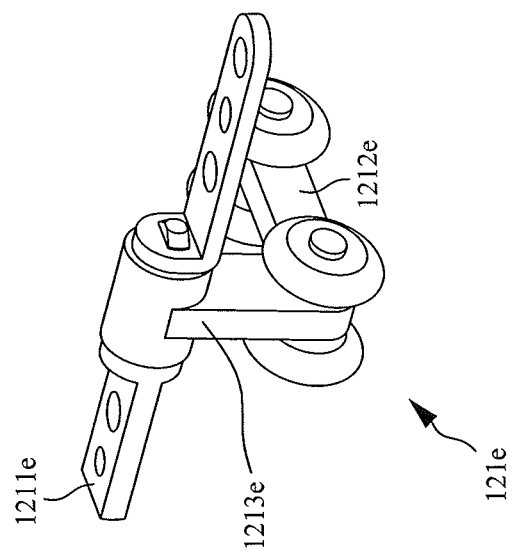
FIG. 5(c) illustrates a schematic view of a sixth embodiment of a roller sliding element of the portable computer of the present invention.

Please refer to FIG. 5(a), FIG. 5(b) and FIG. 5(c). FIG. 5(a) illustrates a schematic view of a fourth embodiment of the sliding assembly 12c of the portable computer 1 of the present invention; FIG. 5(b) illustrates a schematic view of a fifth embodiment of the sliding assembly 12d of the portable computer 1 of the present invention; and FIG. 5(c) illustrates a schematic view of a sixth embodiment of the roller sliding element 121e of the portable computer of the present invention The fourth embodiment is a variation of the abovementioned first embodiment. As shown in FIG. 5(a), in this embodiment, the roller portion 1212c of the roller sliding element 121c of the sliding assembly 12c adopts a single-roller structure to reduce the number of rollers, and the structure element design for fixing roller can provide stability when the roller sliding element 121c is sliding. However, the single-roller structure design is not limited to the scope of this embodiment. The roll axes of the rollers of the roller portions in the abovementioned four embodiments are all substantially perpendicular to an extended direction of the slide rail and substantially parallel to the surface 161 of the base 10.

The fifth embodiment is also a variation of the abovementioned first embodiment. As shown in FIG. 5(b), in this embodiment, the roller portion 1212d of the roller sliding element 121d can adopt a non-coaxial dual roller structure according to different accommodation spaces such as an example that the base 10 has a thinner thickness which is incapable of disposing upright rollers. The sliding assembly 12d utilizes structure elements to form dual axes in parallel and substantially perpendicular to the extended direction of the slide rail 122d and meanwhile substantially perpendicular to the surface 161 of the base 10. Each of the dual axes is respectively pivoted to the roller substantially disposed transversely, such that each of the rollers can respectively contact two side walls of the slide rail 122d for rolling, thereby achieving the same effect as the first embodiment does. However, the design of the non-coaxial dual roller structure is not limited to the above embodiment.

The sixth embodiment is also a variation of the abovementioned first embodiment. As shown in FIG. 5(c), in this embodiment, the roller portion 1212e of the roller sliding element 121e adopts a multi-roller structure. For example, based on the single-axis dual-roller structure of the first embodiment, this embodiment adopts two parallel single-axis dual-roller structures to form a trolley-like type. That is, the parallel dual-axis structures are perpendicular to the extended direction of the slide rail 122e and parallel to the surface 161 of the base 10, and the parallel dual-axis structures are spaced apart in parallel in the extended direction of the slide rail 122e. According to the multi-roller structure, the sliding operation of the roller portion 1212e can be more stable, so as to prevent the problem that the roller sliding element 121e would tilt forwardly or backwardly in the first embodiment. Moreover, the multi-roller structure also makes the slide operation smoother. However, the design of the multi-roller structure is not limited to the above embodiment.

Please note that it is well known for those skilled in the related art to replace or combine upper and lower structures of different roller portions 1212 in the abovementioned embodiments without departing the scope of the present invention.

Figure 6A:
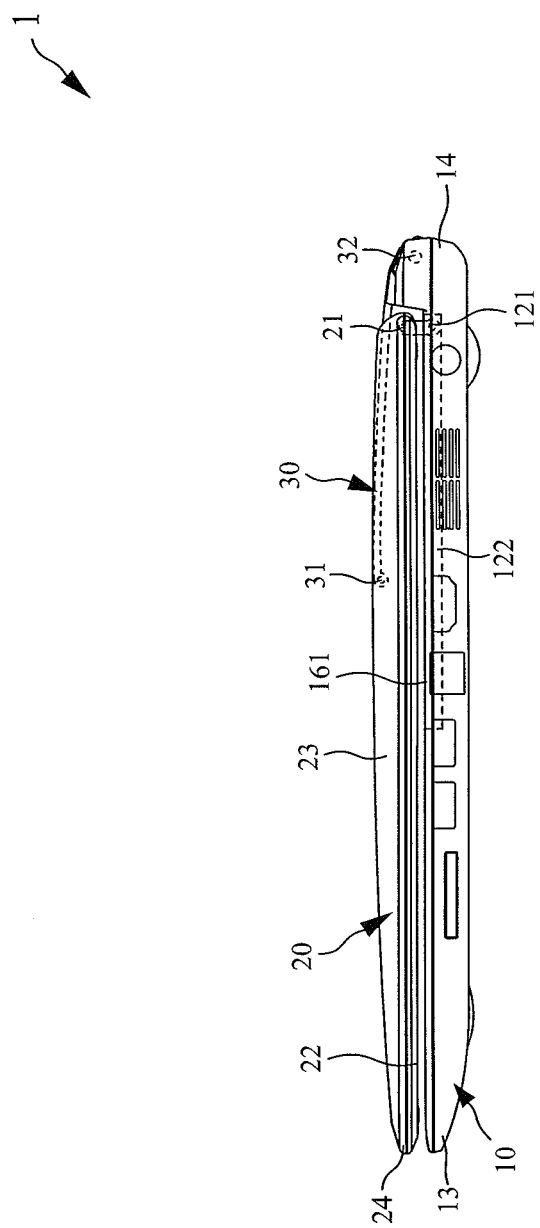
FIG. 6(a) illustrates a schematic view of the first embodiment of the portable computer of the present invention in a closed state.
Figure 6B:
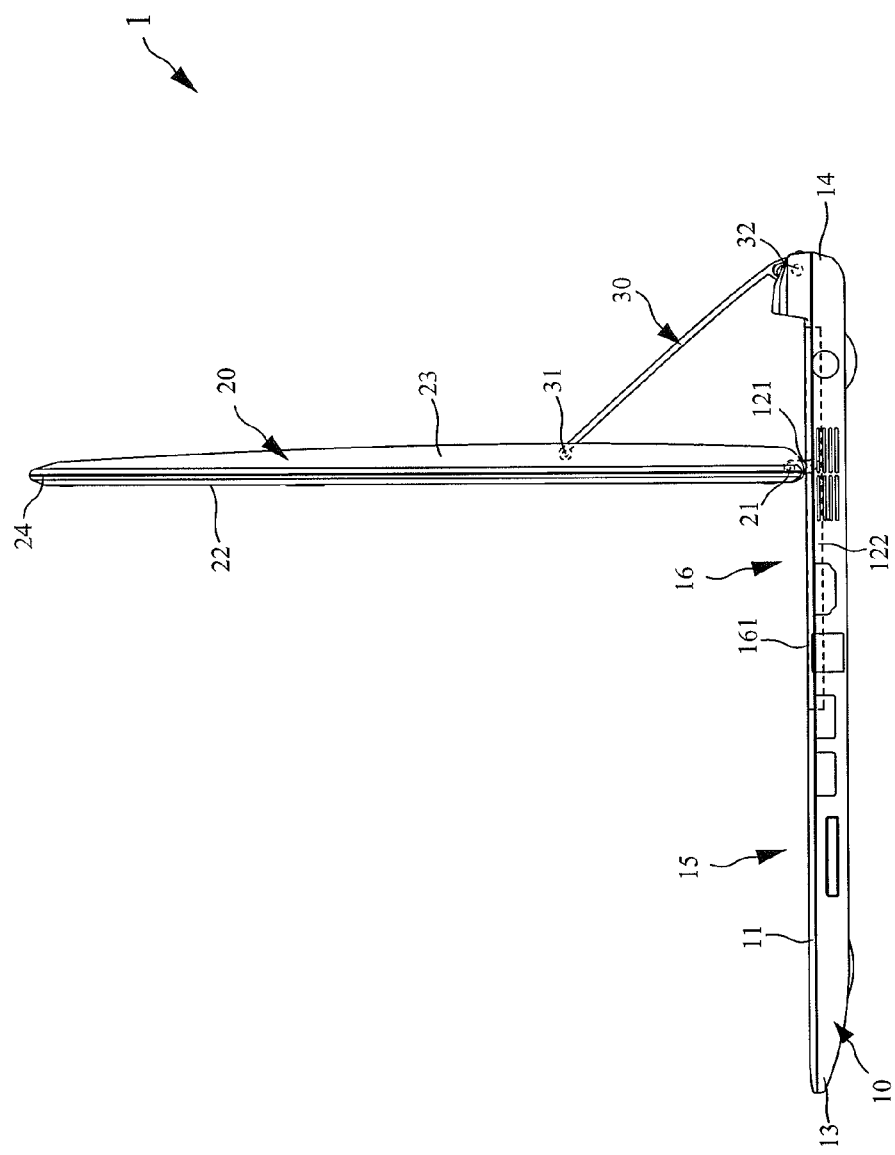
FIG. 6(b) illustrates a schematic view of the first embodiment of the portable computer of the present invention switched from the closed state to an open state.
Figure 6C:
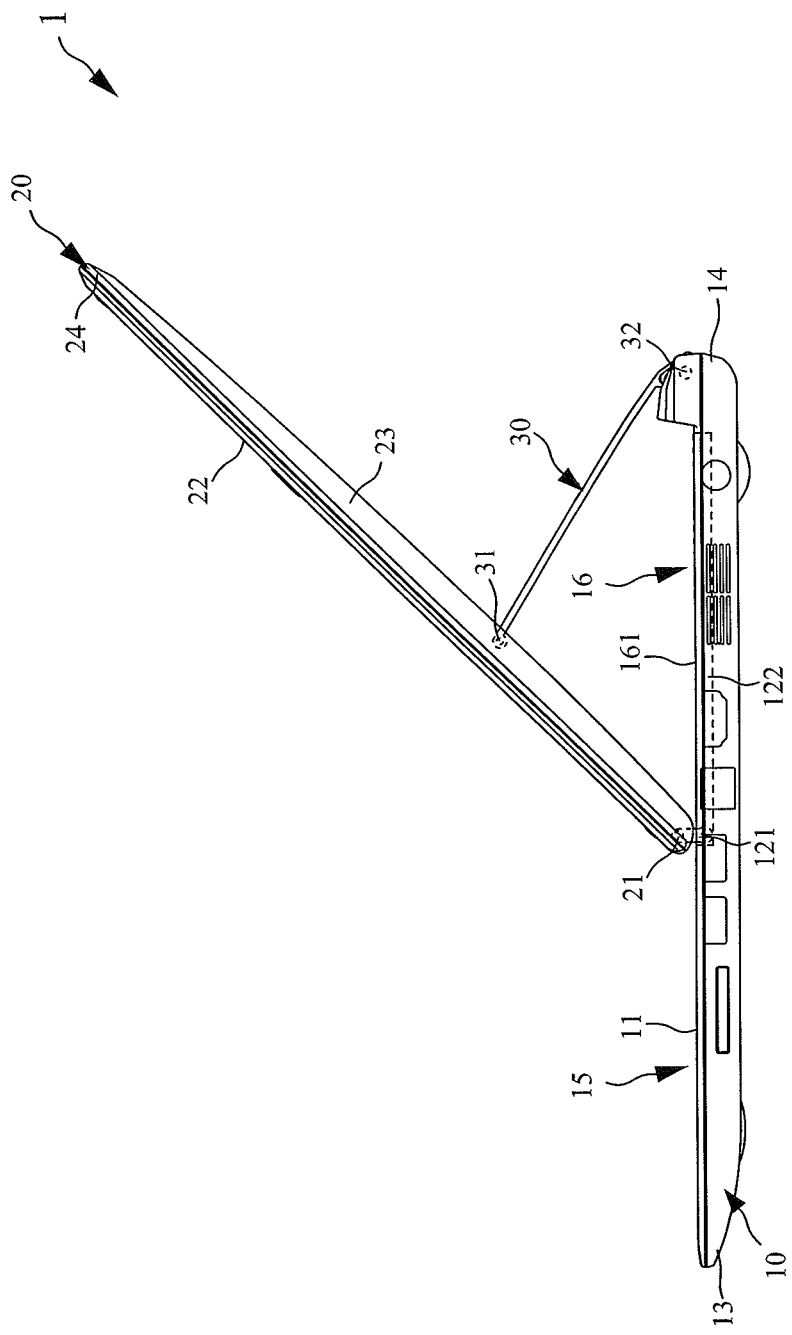
FIG. 6(c) illustrates a schematic view of the first embodiment of the portable computer of the present invention in the open state.

Please refer to FIG. 6(a), FIG. 6(b), and FIG. 6(c). FIG. 6(a) illustrates a schematic view of the first embodiment of the portable computer 1 of the present invention in a closed state; FIG. 6(b) illustrates a schematic view of the first embodiment of the portable computer 1 of the present invention switched from the closed state to an open state; and FIG. 6(c) illustrates a schematic view of the first embodiment of the portable computer of the present invention in the open state. Please note that the structures and the operations of the portable computer 1 of the present invention are illustrated by the first embodiment of the present invention, but other embodiments of the present invention can be applied to execute the same operations; and it is not limited to the present embodiment.

As shown in FIG. 6(a), when the portable computer 1 is in a closed state, the display module 20 overlaps with the base 10 and is pivotally connected to the roller sliding element 121 via the connecting end 21, at this time the display plane 22 of the display module 20 is facing the base 10; the support element 30 also overlaps with the display module 20 and is pivotally connected to the rear end 14 of the base 10 and the display module 20 via the first fixed end 31 and the second fixed end 32 respectively. In this embodiment, when the portable computer 1 is in the closed state, the connecting end 21 of the display module 20 and the second fixed end 32 of the support element 30 are on different axes substantially parallel with each other, and the length of the support element 30 is longer than the distance between the connecting end 21 of the display module 20 and the first fixed end 31 of the support element 30. However, based on different design requirements, the portable computer 1, while in the closed state, can have the connecting end 21 of the display module 20 and the second fixed end 32 of the support element 30 on the same axis to let the support element 30 have a same length as the distance between the connecting end 21 of the display module 20 and the first fixed end 31 of the support element 30.

As shown in FIG. 6(b), when the user exerts a force on the free end 24 opposite to the connecting end 21 of the display module 20 to try to open the display module 20, at first the display module 20 rotates along with the support element 30 relative to the base 10 with the second fixed end 32 serving as a pivot point; after the display module 20 rotates to a certain angle, since the support element 30 has its length not smaller than the distance between the connecting end 21 of the display module 20 and the first fixed end 31 of the support element 30, so the display module 20 can rotate relative to the support element 30 with the first fixed end 31 of the support element 30 serving as the pivot point; meanwhile, the display module 20 can rotate relative to the roller sliding element 121 with the connecting end 21 serving as the pivot point; and the roller sliding element 121 will drive the connecting end 21 of the display module 20 to slide from the second area 16 towards the first area 15.

As shown in FIG. 6(c), when the display module 20 continues to rotate with the first fixed end 31 of the support element 30 serving as the pivot point, and the roller sliding element 121 drives the connecting end 21 of the display module 20 to slide towards the first area 15 to a suitable position (such as the end of the sliding rail 122), then the portable computer 1 is in an open state. At this time the display module 20 has rotated to a suitable angle relative to the base 10, with the display place 22 of the display module 20 facing the user. The display module 20 is supported by the support element 30 to form a tilted angle relative to the base 10.

On the other hand, when the user tries to close the portable computer 1, the user can pull the free end 24 of the display module 20, so that the display module 20 is able to rotate around the first fixed end 31 of the support element 30 with the first fixed end 31 serving as the pivot point; wherein the connecting end 21 will be driven by the roller sliding element 121 to slide towards the rear end 14 of the base 10 until it slides to the other end of the sliding rail 122, at this time the display module 20 rotates around the second fixed end 32 of the support element 30 to return to the closed state.

Therefore, the portable computer 1 only needs to use the sliding assembly 12 disposed at the central position to complete opening/closing functions for the display module without using any complicated linkage elements or structures, thereby reducing the number of required elements and further shrinking the size of the portable computer 1. Besides, the roller portion of the sliding assembly 12 is hidden below the slit 162 of the second area 16 to let the display module 20 stay close to the surface 161 of the second area 16, so the portable computer 1 looks integrated and consistent and eliminates the possibility of hurting the user's finger during opening/closing operations.

Specifically, in the embodiments, the sliding assembly 12 is disposed in the central position of the portable computer 1 and does not take up spaces on both sides of the base 10 and the display module 20. With this design, the user can use only one hand to hold the middle of the free end 24 of the display module 20, which corresponds to the position of the sliding assembly 12, to flip or slide the display module 20 smoothly. During this process, the display module 20 can maintain a stable sliding movement to facilitate operations. Furthermore, the user can initiate the opening process by flipping the display module 20 to let the display module 20 slide to a fixed position automatically, wherein the display module 20 is supported by the support element 30 to keep stable without shaking when the user perform touch operations on the display module 20.

In the previous embodiments, each portable computer 1 comprises a single support element 30 disposed at a central position relative to a sliding assembly 12 to achieve the object of the present invention. However, the present invention can have other implementations depending on different user requirements, effects, and mechanism designs, such the number of the elements, the placement of the elements, and variations of the size, etc. should be view as included in the scope of the present invention. Please note that the sliding block structures using in each of below embodiments of the portable computer is illustrated by the sliding assembly 12 of the first embodiment of the present invention, but the sliding assembly 12 can be by any other the sliding assembly 12a, 12b, 12c, 12d or similar structures; and it is not limited to the present embodiment.

Figure 7A:
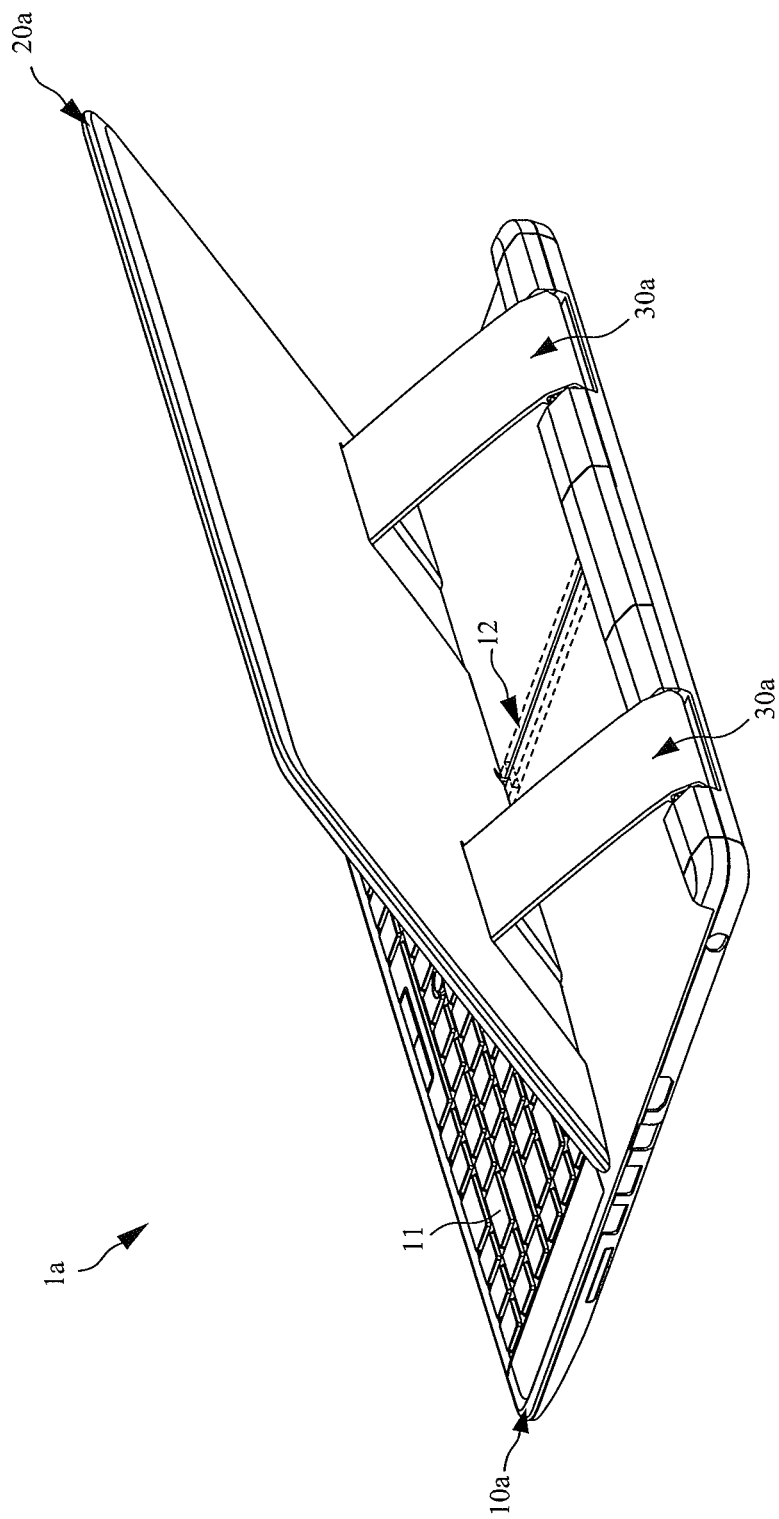
FIG. 7(a) illustrates a schematic view of the second embodiment of the portable computer of the present invention.
Figure 7B:
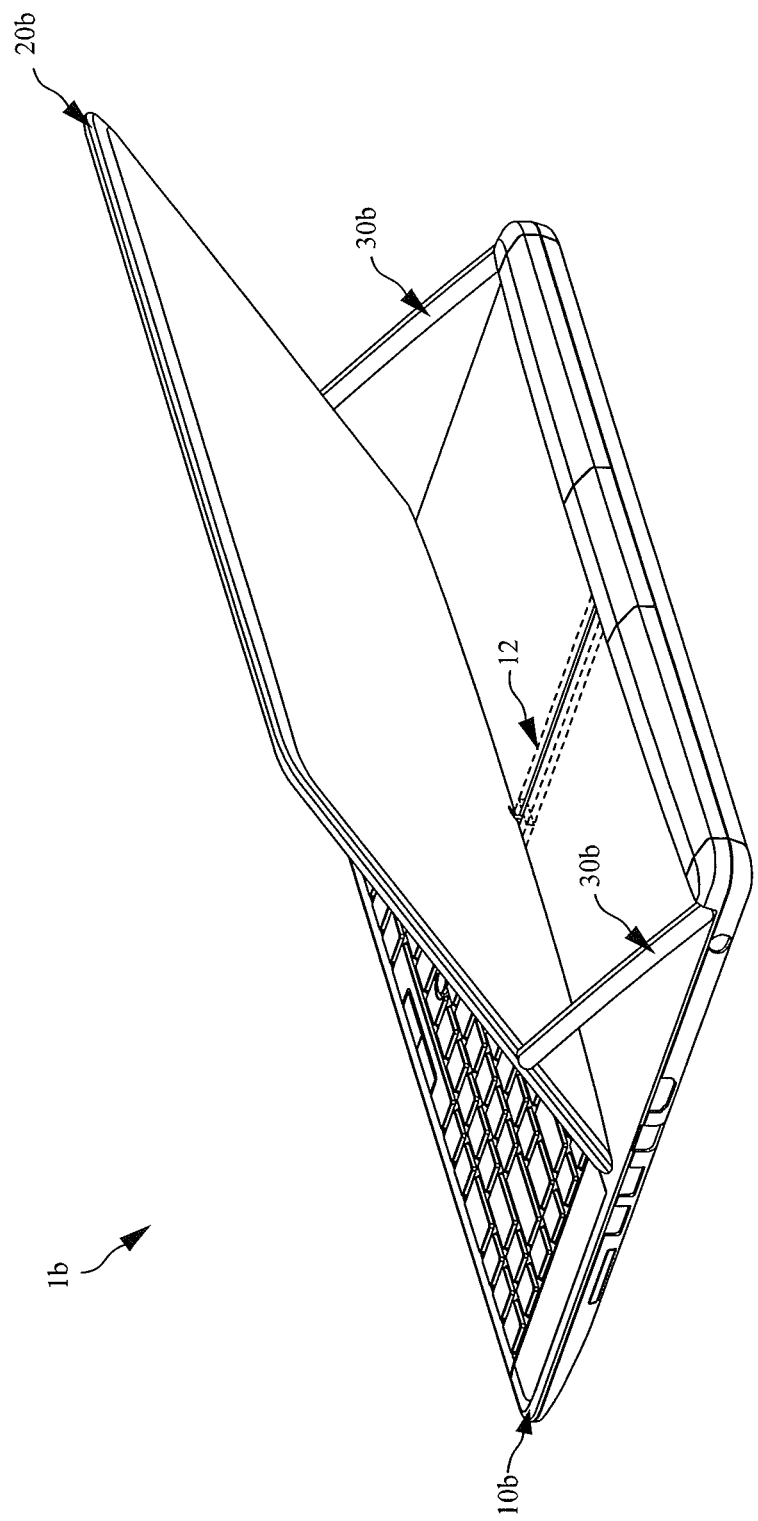
FIG. 7(b) illustrates a schematic view of the third embodiment of the portable computer of the present invention.

For example, please refer to both FIG. 7(a) and FIG. 7(b). FIG. 7(a) illustrates a schematic view of a second embodiment of the portable computer 1a of the present invention; FIG. 7(b) illustrates a schematic view of a third embodiment of the portable computer 1b of the present invention. Alternatively, the portable computer can use more than one support element to support and stabilize the display module, wherein the support elements can be disposed at various positions. As shown in FIG. 7(a), in this embodiment, the portable computer 1a comprises two parallely arranged support elements 30a disposed at two sides of the central sliding assembly 12 respectively to form a symmetrical structure. Each support element 30a has its one end pivotally connected to a plane of the display module 20a other than the display face, and the other end pivotally connected to the rear end of the base. By adding additional support elements (point of support), the present invention can stably support the display module 20a in a sliding movement when it is opening or closing.

Also as shown in FIG. 7(b), this embodiment is a variation of the previous embodiment, wherein the portable computer 1b comprises two support elements 30b disposed at two opposite sides near the rear end, the support elements 30b are formed in a long stick-like shape and implemented as connecting rods for reducing the installation space and simplifying the assembling work, thereby enhancing the operations of the display module 20b. However, in other embodiments, the present invention can have various implementations for a plurality of support elements.

Figure 8:
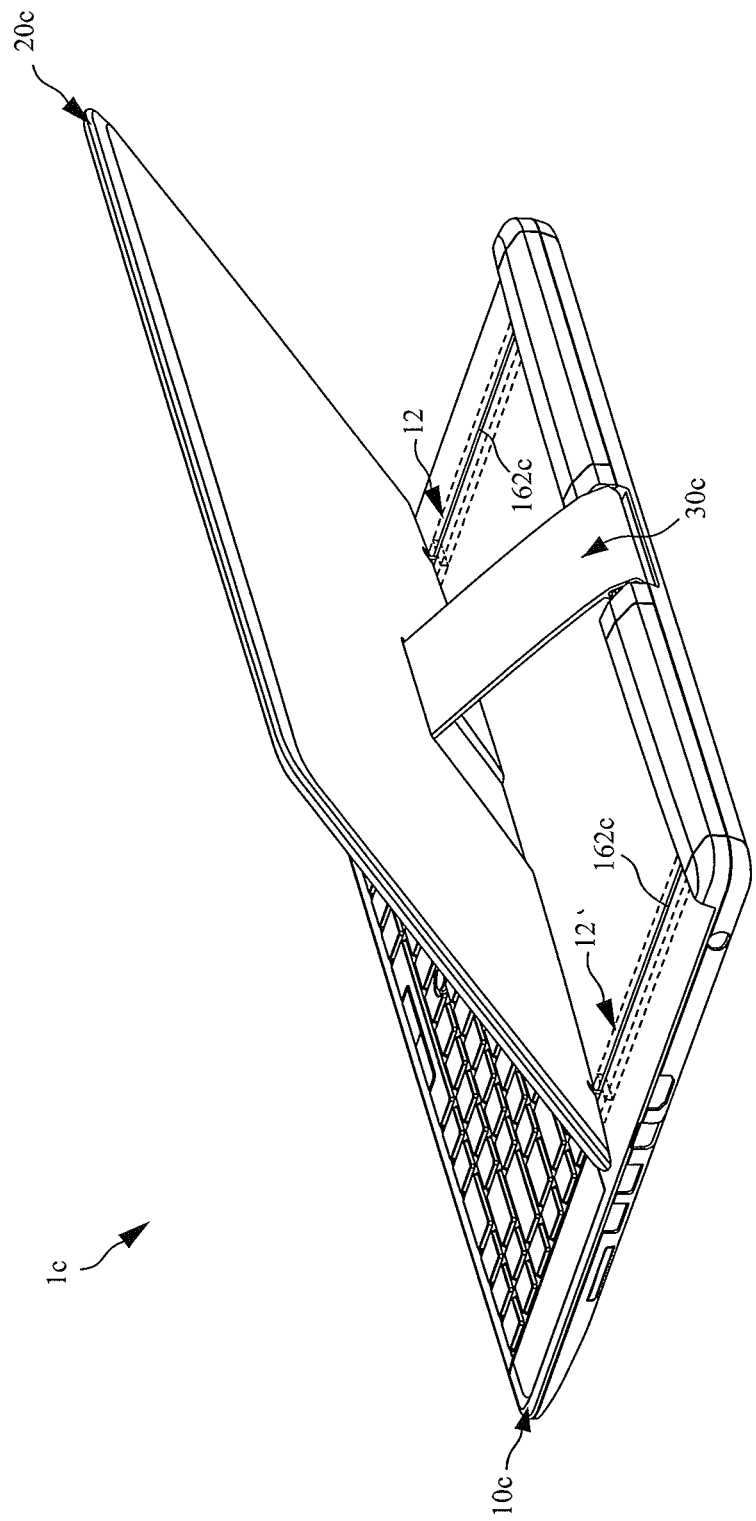
FIG. 8 illustrates a schematic view of the fourth embodiment of the portable computer of the present invention.

Please refer to FIG. 8 for a schematic view of a fourth embodiment of the portable computer 1c of the present invention. Alternatively, in addition to different implementation for the support element, the present invention can also adjust the position of the sliding assembly, the number and positions of slits in the surface of the base to provide various functions. As shown in FIG. 10, in this embodiment, the portable computer 1c comprises two sliding assemblies 12 disposed at two sides of a single support element 30c respectively, and two slits 162c disposed at the base 10e to correspond to the two sliding assemblies 12, wherein the two sliding assemblies 12 and the two slits 162c forms a parallel symmetric structure. Therefore, when the display module 20c is opening or closing, the two sliding assemblies 12 can help to stabilize the sliding movement of the display module 20c.

Those who skilled in the art can easily know that the three embodiments shown in FIG. 7(a) to FIG. 8 can be further combined to form a portable computer which comprises two support elements and two sliding assemblies, therefore, it will not be described in detail.

Figure 9:
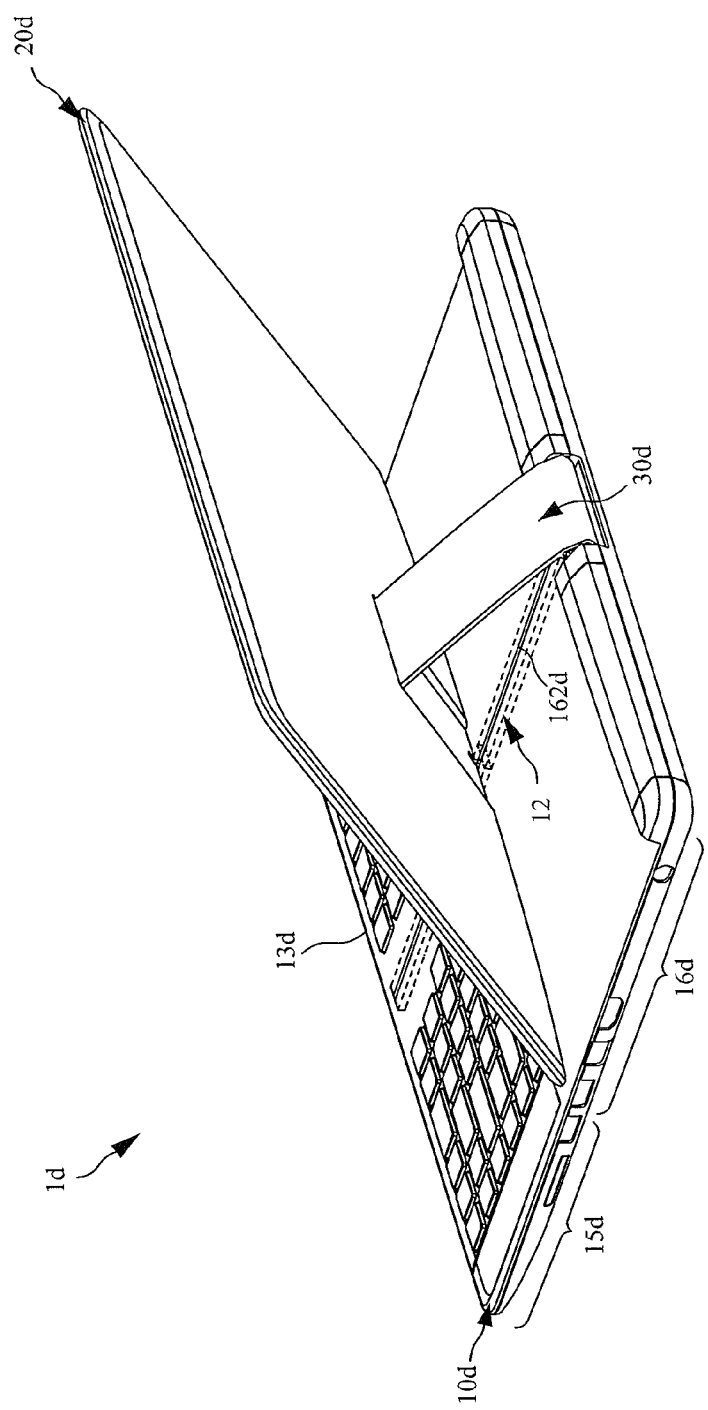
FIG. 9 illustrates a schematic view of the fifth embodiment of the portable computer of the present invention.

Please refer to FIG. 9 for a schematic view of a fifth embodiment of the portable computer 1d of the present invention. The moving distance of the sliding assembly and the length of the corresponding slit can be adjusted according to various design needs. As shown in FIG. 9, in this embodiment, the sliding assembly 12 of the portable computer 1d and a corresponding slit 162d extend from a second area 16d of a base 10d to a first area 15d of the base 10d for extending a sliding distance of a display module 20d and increasing a range of the tilted angle of the display module 20d. Even more, the display module 20d could lie flat on the base 10d to enhance versatility and capability of the portable computer 1d. Based on applications and user requirements, the sliding assembly 12 and the corresponding slit 162d can choose to extend to a part or all (that is, approaching the position of a first end 13d) of the first area 15d, and the extended slit can have any characteristics shown in FIG. 7(a) to FIG. 8 or their combination.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable computer, comprising:
a base comprising, between a front end and a rear end, a first area disposed at a front side of the base and a second area disposed at a rear side of the base;
a display module comprising a connecting end, a display face, and a support plane opposite to the display face;
at least one support element, each support element comprising a first fixed end and a second fixed end, the first fixed end being pivotally connected to a portion of the display module other than the display face so that the display module is able to rotate relative to the support element, and the second fixed end being pivotally connected to the rear end of the base or a proximity of the rear end of the base so that the support element is able to rotate relative to the base; and
at least one sliding assembly, each sliding assembly comprising a roller sliding element and a slide rail, the slide rail being disposed at least in the second area of the base, the roller sliding element being connected with the connecting end of the display module, and the roller sliding element can roll and slide along the slide rail;
whereby, when the display module is opened and rotated to a suitable angle relative to the base via the second fixed end of the at least one support element, the display module further rotates around the first fixed end of the at least one support element with the first fixed end serving as a pivot point and drives the connecting end of the display module to move from the second area towards the first area to a suitable position along with the roller sliding element; and then the display module is supported by the at least one support element to keep a suitable tilted angle.

2. The portable computer as claimed in claim 1, wherein the first area is disposed with a keyboard.

3. The portable computer as claimed in claim 1, wherein the support element has a length not smaller than a distance between the connecting end of the display module and the first fixed end of the support element.

4. The portable computer as claimed in claim 1, wherein the roller sliding element comprises a pivoting portion, and the connecting end of the display module is pivotally connected to the roller sliding element via the pivoting portion.

5. The portable computer as claimed in claim 4, wherein the roller sliding element further comprises a connecting portion and a roller portion for being accommodated in the slide rail, the roller portion is connected to the pivoting portion via the connecting portion, and the roller portion comprises at least one roller, where each roller makes contact with an inner wall of the slide rail for rolling and sliding.

6. The portable computer as claimed in claim 5, wherein the base further comprises a surface having a slit, the slide rail is disposed below the surface corresponding to the slit, and the connecting portion of the roller sliding element goes through the slit to protrude the pivoting portion and a portion of the connecting portion out of the surface, where the slit has a width smaller than the width of the roller portion.

7. The portable computer as claimed in claim 6, wherein the pivoting portion and the surface of the base are spaced apart by a spacing.

8. The portable computer as claimed in claim 7, wherein the pivoting portion comprises at least one retaining portion, such that the roller sliding element can make contact with the surface via the at least one retaining portion while rolling and sliding, so as to keep the spacing between the pivoting portion and the surface.

9. The portable computer as claimed in claim 8, wherein the retaining portion is an elliptical cam structure.

10. The portable computer as claimed in claim 8, wherein the retaining portion is a roller structure.

11. The portable computer as claimed in claim 5, wherein the roller portion is a single-roller structure with a roll axis substantially perpendicular to an extended direction of the slide rail and substantially parallel to the surface of the base.

12. The portable computer as claimed in claim 5, wherein the roller portion is a coaxial dual roller structure with a roll axis substantially perpendicular to an extended direction of the slide rail and substantially parallel to the surface of the base.

13. The portable computer as claimed in claim 5, wherein the roller portion is a parallel biaxial dual roller structure with roll axes substantially perpendicular to the surface of the base and substantially perpendicular to an extended direction of the slide rail.

14. The portable computer as claimed in claim 5, wherein the roller portion is a parallel biaxial multi-roller structure with roll axes substantially perpendicular to an extended direction of the slide rail and substantially parallel to the surface of the base, and the roll axes are spaced apart in parallel in the extended direction of the slide rail.

15. The portable computer as claimed in claim 1, wherein when the display module overlaps with the base in a closed state, the connecting end of the display module and the second fixed end of the support element remain on the same axis.

16. The portable computer as claimed in claim 1, wherein when the display module overlaps with the base in a closed state, the connecting end of the display module and the second fixed end of the support element are respectively on different axes substantially parallel with each other.

17. The portable computer as claimed in claim 6, wherein the surface having the slit corresponds to the second area, and the slide rail is disposed correspondingly below the surface of the second area corresponding to the slit.

18. The portable computer as claimed in claim 6, wherein the surface having the slit comprises the second area and at least part of or all of the first area, and the slide rail is disposed correspondingly below the surface comprising the second area and at least part of or all of the first area corresponding to the slit.

19. The portable computer as claimed in claim 1, wherein the at least one support element comprises two support elements arranged in parallel.

20. The portable computer as claimed in claim 1, wherein the at least one sliding assembly comprises two sliding assemblies disposed in parallel and spaced apart, the two slide rails are disposed in parallel at least in the second area, and each of the roller sliding element is respectively and pivotally connected to the connecting end of the display module corresponding to each of the slide rail.

21. The portable computer as claimed in claim 1, wherein the at least one sliding assembly comprises a single sliding assembly disposed at the central position of at least the second area of the base, the slide rail is disposed at the central position of at least the second area of the base, and the roller sliding element is correspondingly disposed at the central position of the connecting end of the display module.

22. The portable computer as claimed in claim 1, wherein the roller sliding element is rotatably and pivotally connected with the connecting end of the display module.

* * * * *